US00RE41652E

(19) United States
(12) Reissued Patent
Proper

(10) Patent Number: US RE41,652 E
(45) Date of Reissued Patent: Sep. 7, 2010

(54) TONER WITH INCREASED AMOUNT OF SURFACE ADDITIVES AND INCREASED SURFACE ADDITIVE ADHESION

(75) Inventor: James M. Proper, Webster, NY (US)

(73) Assignee: Xerox Corporation, Norwalk, CT (US)

(21) Appl. No.: 12/478,579

(22) Filed: Jun. 4, 2009

Related U.S. Patent Documents

Reissue of:
(64) Patent No.: 6,756,173
Issued: Jun. 29, 2004
Appl. No.: 10/024,196
Filed: Dec. 21, 2001

U.S. Applications:
(
(60) Provisional application No. 60/258,271, filed on Dec. 27, 2000.

(51) Int. Cl.
*G03G 9/10* (2006.01)

(52) U.S. Cl. ..... 430/111.1; 430/108.1; 430/110.1; 430/110.4; 430/137.21

(58) Field of Classification Search ..... 430/111.4, 430/108.1, 110.1, 110.4, 137.21
See application file for complete search history.

(56) References Cited

U.S. PATENT DOCUMENTS 3,944,493 A 3/1976 Jadwin et al.
4,007,293 A 2/1977 Mincer et al.
4,054,465 A 10/1977 Ziobrowski
4,079,014 A 3/1978 Burness et al.
4,298,672 A 11/1981 Lu
4,338,380 A 7/1982 Erickson et al.
4,394,430 A 7/1983 Jadwin et al.
4,433,040 A 2/1984 Niimura et al.
4,845,003 A 7/1989 Kiriu et al.
4,894,308 A 1/1990 Mahabadi et al.
4,937,157 A 6/1990 Haack et al.
4,937,439 A 6/1990 Wanninger et al.
5,370,962 A 12/1994 Anderson et al.
5,624,079 A 4/1997 Higuchi et al.
5,714,299 A 2/1998 Combes et al.
5,716,751 A 2/1998 Bertrand et al.
5,763,132 A 6/1998 Ott et al.
5,874,034 A 2/1999 Proper et al.
5,998,079 A 12/1999 Thompson et al.
6,245,474 B1 6/2001 Hsu et al.

*Primary Examiner*—Mark A Chapman
(74) *Attorney, Agent, or Firm*—Oliff & Berridge, PLC

(57) ABSTRACT

A toner and process for making the toner wherein each combined resin and colorant particle has an average size less than about 10 microns and wherein the surface additive particles averaging less than about 40 nanometers in size average greater than two (2) percent of the combined weight of resin and colorant in the toner and wherein the Additive Adhesion Force Distribution percent value after 12 kilojoules of energy is greater than 40 percent.

14 Claims, 7 Drawing Sheets

TONER WITH INCREASED AMOUNT OF SURFACE ADDITIVES AND INCREASED SURFACE ADDITIVE ADHESION

Matter enclosed in heavy brackets [ ] appears in the original patent but forms no part of this reissue specification; matter printed in italics indicates the additions made by reissue.

CROSS-REFERENCE TO COPENDING APPLICATIONS

This application is based on a Provisional Patent Application No. 60/258,271, filed Dec. 27, 2000.

Attention is directed to commonly owned and assigned copending Applications Nos.: U.S. Ser. No. 09/748,920, filed Dec. 27, 2000 entitled "BLENDING TOOL WITH AN ENLARGED COLLISION SURFACE FOR INCREASED BLEND INTENSITY AND METHOD OF BLENDING TONERS" and U.S. Ser. No. 09/749,059, filed Dec. 27, 2000 entitled "BLENDING TOOL WITH AN ADJUSTABLE COLLISION PROFILE AND METHOD OF ADJUSTING THE COLLISION PROFILE".

BACKGROUND OF THE INVENTION

The field of the proposed invention relates to high intensity blending apparatus and processes, particularly for blending operations designed to cause additive materials to become affixed to the surface of base particles. More particularly, the proposed invention relates to an improved method for producing surface modifications to electrophotographic and related toner particles.

High speed blending of dry, dispersed, or slurried particles is a common operation in the preparation of many industrial products. Examples of products commonly made using such high-speed blending operations include, without limitation, paint and colorant dispersions, pigments, varnishes, inks, pharmaceuticals, cosmetics, adhesives, food, food colorants, flavorings, beverages, rubber, and many plastic products. In some industrial operations, the impacts created during such high-speed blending are used both to uniformly mix the blend media and, additionally, to cause attachment of additive chemicals to the surface of particles (including resin molecules or conglomerates of resins and particles) in order to impart additional chemical, mechanical, and/or electrostatic properties. Such attachment between particles is typically caused by both mechanical impaction and electrostatic bonding between additives and particles as a result of the extreme pressures created by particle/additive impacts within the blender device. Among the products wherein attachments between particles and/or resins and additive particles are important during at least one stage of manufacture are paint dispersions, inks, pigments, rubber, and certain plastics.

A typical blending machine and blending tool of the prior art is exemplified in FIGS. 1 and 2. FIG. 1 is a schematic elevational view of a blending machine 2. Blending machine 2 comprises a vessel 10 into which materials to be mixed and blended are added before or during the blending process. Housing base 12 supports the weight of vessel 10 and its contents. Motor 13 is located within housing base 12 such that its drive shaft 14 extends vertically through an aperture in housing 12. Shaft 14 also extends into vessel 10 though sealed aperture 15 located at the bottom of vessel 10. Shaft 14 is fitted with a locking fixture 17 at its end, and blending tool 16 is rigidly attached to shaft 14 by locking fixture 17. Before blending is commenced, lid 18 is lowered and fastened onto vessel 10 to prevent spillage. For high intensity blending, the speed of the rotating tool at its outside edge generally exceeds 50 ft./second. The higher the speed, the more intense, and tool speeds in excess of 90 ft./second, or 100 ft./second are common.

Turning now to FIG. 2, a perspective view of blending tool 16 of the prior art is shown. Center shank 20 has a central fixture 17A for engagement by locking fixture 17 (shown in FIG. 1). In the example shown, the central fixture 17A is a simple notched hole for receiving a male fixture 17 (from FIG. 1) having the same dimensions. Arrow 21 shows the direction in which tool 16 rotates upon shaft 14. Vertical surfaces 19A and 19B are fixed to the end of center shank 20 in order to increase the surface area of the tool at its point of greatest velocity. This increases the tool's "intensity", or number of collisions per unit of time. In addition to the surface area of the tool's face, the intensity of a tool is influenced by tool speed and the shape of the tool. The importance of the shape of the tool will be discussed below. Vertical surfaces 19A and 19B combined with the leading edge of center shank 20 are the surfaces of tool 16 that collide with particles mixed within vessel 10 (shown in FIG. 1). The area through which these surfaces 19 and leading edge of center shank 20 sweep during rotation of tool 16 can be thought of as the working profile of the tool. In other words, the "profile" of a tool equals the 2-dimensional area outlined by collision surfaces of the tool as it sweeps through a plane that includes the rotational axis of shaft 14. In FIG. 2, the space or zone immediately behind rotating tool 16 is labeled 22.

Various shapes and thicknesses of blending tools and collision surfaces are possible. Various configurations are shown in the brochures and catalogues offered by manufacturer's of high-speed blending equipment such as Henschel, Littleford Day Inc., and other vendors. The tool shown in FIG. 2 is based upon a tool for high intensity blending produced by Littleford Day, Inc. Among the reasons for different configurations of blending tools are (i) different viscosities often require differently shaped tools to efficiently utilize the power and torque of the blending motor; and (ii) different blending applications require different intensities of blending. For instance, some food processing applications may require a very fine distribution of small solid particles such as colorants and flavorings within a liquid medium. Similarly, the processing of snow cones requires rapid and very high intensity blending designed to shatter ice cubes into small particles which are then mixed within the blender with flavored syrups to form a slurry.

Most high-speed blending tools of the prior art do not have raised vertical elements such as surfaces 19 shown in FIG. 2. Instead, a typical blending tool has a collision surface formed simply by the leading edge of its central shank 20. In many tools, the leading edge is rounded or arcurately shaped in order to avoid a "snow plow" effect wherein particles become caked upon a flat leading face much as snow is compressed and forms piles in front of a snow plow. The tool shown in FIG. 2 attempts to avoid this snow plow effect on raised collision surfaces 19 by slanting the forward face of surfaces 19 at an acute angle, thereby causing particles to either bounce upward from the tool or be swept by friction upward along the face of the tool until carried over its top and into the lee of the tool. However, a problem with the tool shown in FIG. 2 and with other tools in the prior art is that an enlarged collision surface tends to create vortices in the wake of the tool as well as to decrease the overall density of particles in the zone 22 behind the tool. The degree of such density variations depends primarily upon the speed of the tool through the particle mixture as well as the height, width, and depth of the collision surface 19.

Because of the above snow plow, vortex, and density limitations, conventional tools such as shown in FIG. 2 are limited both in height and in the width of any enlarged collision surface. Indeed, it is believed that in tools of the prior art that have elements raised above center shank 20, the height (defined below as the y-axis dimension) of such vertically raised elements is less than the depth (defined below as the z-axis dimension) of center shank 20 in its region proximate to the attachment point of the enlarged element. It is also believed that the width (defined below as the x-axis dimension) of any vertically raised element of a conventional tool has not exceeded the height, or y-axis, of center shank 20 in the region of center shank 20 proximate to where the raised element is attached. Lastly, it is believed that in high-speed blending tools of the prior art that have raised elements, the z-axis dimension, or depth, of the raised element greatly exceeds its width, or x-axis, dimension. For clarification, the height, or y-axis, dimension of a blending tool and its elements shall mean the dimension of the tool or element in the plane that contains shaft 14 around which the tool rotates. The depth, or z-axis, of the tool and its elements shall mean the dimension perpendicular both to the axis of the tool's center shank and to the y-axis. The x-axis of the tool and its elements shall be measured in the direction of the axis of the tool's center shank. For center shank 20 itself, the x-axis dimension is a measure of its length. For any raised collision surface, the x-axis is a measure of its width.

Another characteristic of blending tools of the prior art is derived from the above limitations upon the height of the collision surface. Specifically, as explained above, conventional tools are thin in height and, if a vertical surface such as 19 is present, such vertical surface is also has a thin x-axis profile. Such thinness is required in order to avoid excessive vortices and low density regions in the lee of the tool. The trailing edges of conventional tools are sometimes rounded or arcurately shaped. However, because of the "thinness" of the tool in the y-axis, it is not necessary and it is not known to arcurately shape the leading or trailing surfaces of the tool except in the region proximate to the leading and/or trailing edge.

As noted above, different mixture formulations or products often specify different collision surface shapes and dimensions in order to optimize blend efficiency, blend time, and power consumption. For instance, if a fast blend process time is desired, then the blend tool can be rotated faster or a tool with a larger collision surface can be selected in order to increase the number of particle collisions per unit of time, or blending intensity. However, for any given viscosity, the power and configuration of the blending motor effectively limits the speed of the tool and the size of a collision surface such as surface 19.

When the same blending vessel is used for different formulations or products requiring different tools, then procedures for changing a conventional blending tool require the following steps (described in relation to FIG. 1) (A) lid 17 is unfastened and opened from the top of vessel 10; (B) vessel 10 and tool 16 need to be at least partially cleaned by vacuum and by wiping, especially in the region where blending tool 16 is secured to shaft 14; (C) locking fixture 17 is loosened to allow unfastening of tool 16 from shaft 14; (D) blending tool 16 is detached from the locking fixture 17; (D) blending tool 16 is lifted from vessel 10 with care not to bump or scratch the sides of vessel 10; (F) removed tool 16 is thoroughly cleaned before further handling and/or storage; and (G) the preceding tasks (except cleaning) are repeated in reverse order for attachment of a different blending tool 16. For large blender vessels that are common in many if not most industrial applications, the weight of blending tool 16 requires a crane or hoist during unfastening, lifting, positioning of the replacement tool, and refastening. A human operator inside vessel 10 typically needs to help maneuver the crane or hoist during this process, and the combination of positioning a large tool while simultaneously attempting to fasten it onto shaft 14 can place the human operator in an awkward position. Even for smaller blenders, replacement of the tool requires fairly careful cleaning of shaft 14 and tool 16 and often requires an awkward manipulation while simultaneously positioning and fastening replacement tool 16.

In addition to changing a blending tool to accommodate the requirements of different formulations or products, blending tools may require changing when excessively worn. Many industrial applications require blending of abrasive particles such as pigments, colorants (including carbon black), and electrophotographic toners. The above procedures for changing a tool must be used whenever a worn tool requires replacement.

The relevance of the above description of blending tool 16 to the manufacture of electrophotographic, electrostatic or similar toners is demonstrated by the following description of a typical toner manufacturing process. A typical polymer based toner is produced by melt-mixing the heated polymer resin with a colorant in an extruder, such as a Weiner Pfleider ZSK-53 or WP-28 extruder, whereby the pigment is dispersed in the polymer. For example, the Werner Pfleiderer WP-28 extruder when equipped with a 15 horesepower motor is well-suited for melt-blending the resin, colorant, and additives. This extruder has a 28 mm barrel diameter and is considered semiworks-scale, running at peak throughputs of about 3 to 12 lbs./hour.

Toner colorants are particulate pigments or, alternatively, are dyes. Numerous colorants can be used in this process, including but not limited to:

| Pigment Brand Name | Manufacturer | Pigment Color Index |
|---|---|---|
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar .RTM. Yellow TY-858-D | Heubach | Yellow 74 |
| Hansa Yellow X | Hoechst | Yellow 75 |
| Novoperm .RTM. Yellow HR | Hoechst | Yellow 75 |
| Cromophtal .RTM. Yellow 3G | Ciba-Geigy | Yellow 93 |
| Cromophtal .RTM. Yellow GR | Ciba-Geigy | Yellow 95 |
| Novoperm .RTM. Yellow FGL | Hoechst | Yellow 97 |
| Hansa Brilliant Yellow 10GX | Hoechst | Yellow 98 |
| Lumogen .RTM. Light Yellow | BASF | Yellow 110 |
| Permanent Yellow G3R-01 | Hoechst | Yellow 114 |
| Cromophtal .RTM. Yellow 8G | Ciba-Geigy | Yellow 128 |
| Irgazin .RTM. Yellow 5GT | Ciba-Geigy | Yellow 129 |
| Hostaperm .RTM. Yellow H4G | Hoechst | Yellow 151 |
| Hostaperm .RTM. Yellow H3G | Hoechst | Yellow 154 |
| L74-1357 Yellow | Sun Chem. | |
| L75-1331 Yellow | Sun Chem. | |
| L75-2377 Yellow | Sun Chem. | |
| Hostaperm .RTM. Orange GR | Hoechst | Orange 43 |
| Paliogen .RTM. Orange | BASF | Orange 51 |
| Irgalite .RTM. 4BL | Ciba-Geigy | Red 57:1 |

-continued

| Pigment Brand Name | Manufacturer | Pigment Color Index |
|---|---|---|
| Fanal Pink | BASF | Red 81 |
| Quindo .RTM. Magenta | Mobay | Red 122 |
| Indofast .RTM. Brilliant Scarlet | Mobay | Red 123 |
| Hostaperm .RTM. Scarlet GO | Hoechst | Red 168 |
| Permanent Rubine F6B | Hoechst | Red 184 |
| Monastral .RTM. Magenta | Ciba-Geigy | Red 202 |
| Monastral .RTM. Scarlet | Ciba-Geigy | Red 207 |
| Heliogen .RTM. Blue L 6901F | BASF | Blue 15:2 |
| Heliogen .RTM. Blue NBD 7010 | BASF | |
| Heliogen .RTM. Blue K 7090 | BASF | Blue 15:3 |
| Heliogen .RTM. Blue K 7090 | BASF | Blue 15:3 |
| Paliogen .RTM. Blue L 6470 | BASF | Blue 60 |
| Heliogen .RTM. Green K 8683 | BASF | Green 7 |
| Heliogen .RTM. Green L 9140 | BASF | Green 36 |
| Monastral .RTM. Violet R | Ciba-Geigy | Violet 19 |
| Monastral .RTM. Red B | Ciba-Geigy | Violet 19 |
| Quindo .RTM. Red R6700 | Mobay | |
| Quindo .RTM. Red R6713 | Mobay | |
| Indofast .RTM. Violet | Mobay | Violet 23 |
| Monastral .RTM. Violet Maroon B | Ciba-Geigy | Violet 42 |
| Sterling .RTM. NS Black | Cabot | Black 7 |
| Sterling .RTM. NSX 76 | Cabot | |
| Tipure .RTM. R-101 | DuPont | |
| Mogul L | Cabot | |
| BK 8200 Black Toner | Paul Uhlich | |

Any suitable toner resin can be mixed with the colorant by the downstream injection of the colorant dispersion. Examples of suitable toner resins which can be used include but are not limited to polyamides, epoxies, diolefins, polyesters, polyurethanes, vinyl resins and polymeric esterification products of a dicarboxylic acid and a diol comprising a diphenol. Any suitable vinyl resin may be selected for the toner resins of the present application, including homopolymers or copolymers of two or more vinyl monomers. Typical vinyl monomeric units include: styrene, p-chlorostyrene, vinyl naphthalene, unsaturated monoolefins such as ethylene, propylene, butylene, and isobutylene; vinyl halides such as vinyl chloride, vinyl bromide, vinyl fluoride, vinyl acetate, vinyl propionate, vinyl benzoate, vinyl butyrate, and the like; vinyl esters such as esters of monocarboxylic acids including methyl acrylate, dodecyl acrylate, n-octyl acrylate, 2-chloroethyl acrylate, phenyl acrylate, methylalphachloroacrylate, methyl methacrylate, ethyl methacrylate, and butyl methacrylate; acrylonitrile, methacrylonitrile, acrylimide; vinyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl indole, N-vinyl pyrrolidene and the like; styrene butadiene copolymers, Pliolites, available from Goodyear Company, and mixtures thereof.

The resin or resins are generally present in the resin-toner mixture in an amount of from about 50 percent to about 100 percent by weight of the toner composition, and preferably from about 80 percent to about 100 percent by weight.

Additional "internal" components of the toner may be added to the resin prior to mixing the toner with the additive. Alternatively, these components may be added during extrusion. Various known suitable effective charge control additives can be incorporated into toner compositions, such as quaternary ammonium compounds and alkyl pyridinium compounds, including cetyl pyridinium halides and cetyl pyridinium tetrafluoroborates, as disclosed in U.S. Pat. No. 4,298,672, the disclosure of which is totally incorporated herein by reference, distearyl dimethyl ammonium methyl sulfate, and the like. Particularly preferred as a charge control agent is cetyl pyridinium chloride. The internal charge enhancing additives are usually present in the final toner composition in an amount of from about 1 percent by weight to about 20 percent by weight.

After the resin, colorants, and internal additives have been extruded, the resin mixture is reduced in size by any suitable method including those known in the art. Such reduction is aided by the brittleness of most toners which causes the resin to fracture when impacted. This allows rapid particle size reduction in pulverizers or attritors such as media mills, jet mills, hammer mills, or similar devices. An example of a suitable hammer mill is an Alpine RTM Hammer Mill. Such a hammer mill is capable of reducing typical toner particles to a size of about 10 microns to about 30 microns. For color toners, toner particle sizes may average within an even smaller range of 4–10 microns.

After reduction of particle size by grinding or pulverizing, a classification process sorts the particles according to size. Particles classified as too large are typically fed back into the grinder or pulverizer for further reduction. Particles within the accepted range are passed onto the next toner manufacturing process.

After classification, the next typical process is a high speed blending process wherein surface additive particles are mixed with the classified toner particles within a high speed blender. These additives include but are not limited to stabilizers, waxes, flow agents, other toners and charge control additives. Specific additives suitable for use in toners include fumed silica, silicon derivatives such as Aerosil-.RTM. R972, available from Degussa, Inc., ferric oxide, hydroxy terminated polyethylenes such as Unilin RTM., polyolefin waxes, which preferably are low molecular weight materials, including those with a molecular weight of from about 1,000 to about 20,000, and including polyethylenes and polypropylenes, polymethylmethacrylate, zinc stearate, chromium oxide, aluminum oxide, titanium oxide, stearic acid, and polyvinylidene fluorides such as Kynar. In aggregate these additives are typically present in amounts of from about 0.1 to about 1 percent by weight of toner particles. More specifically, zinc stearate shall preferably be present in an amount of from about 0.4 to about 0.6 weight percent. Similar amounts of Aerosi.RTM. is preferred. For proper attachment and functionality, typical additive particle sizes range from 5 nanometers to 50 nanometers. Some newer toners require a greater number of additive particles than prior toners as well as a greater proportion of additives in the 25–50 nanometer range. When combined with smaller toner particle sizes required by color toners, the increased size and coverage of additive particles for some color toners creates increased need for high intensity blending.

The amount of external additives is measured in terms of percentage by weight of the toner composition, and the additives themselves are not included when calculating the percentage composition of the toner. For example, a toner composition containing a resin, a colorant, and an external additive may comprise 80 percent by weight resin and 20 percent by weight colorant. The amount of external additive present is reported in terms of its percent by weight of the combined resin and colorant.

The above additives are typically added to the pulverized toner particles in a high speed blender such as a Henschel Blender FM-10, 75 or 600 blender. The high intensity blending serves to break additive agglomerates into the appropriate nanometer size, evenly distribute the smallest possible additive particles within the toner batch, and attach the smaller additive particles to toner particles. Each of these processes occurs concurrently within the blender. Additive particles become attached to the surface of the pulverized toner particles during collisions between particles and between particles and the blending tool as it rotates. It is believed that such attachment between toner particles and surface additives occurs due to both mechanical impaction and electrostatic attractions. The amount of such attachments is proportional to the intensity level of blending which, in turn, is a function of both the speed and shape (particularly size) of the blending tool. The amount of time used for the blending process plus the intensity determines how much energy is applied during the blending process. For this purpose, "intensity" means the number of particle collisions per unit of time. For an efficient blending tool that avoids snow plowing and excessive vortices and low density regions, "intensity" can be effectively measured by reference to the power per unit mass (typically expressed as W/lb) of the blending motor driving the blending tool. Using a standard Henschel Blender tool to manufacture conventional toners, the blending times typically range from one (1) minute to twenty (20) minutes per typical bath of 60–1000 kilograms. For certain more recent toners such as toners for Xerox Docucenter 265 and related multifunctional printers, blending speed and times are increased in order to assure the multiple layers of surface additives become attached to the toner particles. Additionally, for those toners that require a greater proportion of additive particles in excess of 25 nanometers, more blending speed and time is required to force the larger additives into the base resin particles.

The process of manufacturing toners is completed by a screening process to remove toner agglomerates and other large debris. Such screening operation may typically be performed using a Sweco Turbo screen set to 37 to 105 micron openings.

The above description of a process to manufacture an electrophotographic toner may be varied depending upon the requirements of particular toners. In particular, for full process color printing, colorants typically comprise yellow, cyan, magenta, and black colorants added to separate dispersions for each color toner. Colored toner typically comprises much smaller particle size than black toner, in the order of 4–10 microns. The smaller particle size makes the manufacturing of the toner more difficult with regard to material handling, classification and blending.

The above general description of a process for making electrophotographic toners is well known in the art. More information concerning methods and apparatus for manufacture of toner are available in the following U.S. patents, and each of the disclosures of which are incorporated herein: U.S. Pat. No. 4,338,380 issued to Erickson, et al; U.S. Pat. No. 4,298,672 issued to Chin; U.S. Pat. No. 3,944,493 issued to Jadwin; U.S. Pat. No. 4,007,293 issued to Mincer, et al; U.S. Pat. No. 4,054,465 issued to Ziobrowski; U.S. Pat. No. 4,079,014 issued to Burness, et al; U.S. Pat. No. 4,394,430 issued to Jadwin, et al; U.S. Pat. No. 4,433,040 issued to Niimura, et al; U.S. Pat. No. 4,845,003 issued to Kiriu, et al; U.S. Pat. No. 4,894,308 issued to Mahabadi et al.; U.S. Pat. No. 4,937,157 issued to Haack, et al; U.S. Pat. No. 4,937,439 issued to Chang et al.; U.S. Pat. No. 5,370,962 issued to Anderson, et al; U.S. Pat. No. 5,624,079 issued to Higuchi et al.; U.S. Pat. No. 5,716,751 issued to Bertrand et al.; U.S. Pat. No. 5,763,132 issued to Ott et al.; U.S. Pat. No. 5,874,034 issued to Proper et al.; and U.S. Pat. No. 5,998,079 issued to Tompson et al.

As described above, the process of blending plays an increasingly important role in the manufacture of electrophotographic and similar toners. It would be advantageous if an apparatus and method were found to accelerate the blending process and to thereby diminish the time and cost required for blending. Similarly, since different formulations and products often require different blending speed and intensities, it would be advantageous if an apparatus and method were found to allow a single blending tool to be reconfigured in situ for various blending intensities rather than requiring cleaning, removal, and replacement of the entire blending tool for each required change in intensity. Lastly, it would be advantageous to create an improved toner having a greater quantity of surface additives than heretofore manufactured and having such additives adhere to toner particles with greater force than heretofore manufactured.

SUMMARY OF THE INVENTION

One aspect of the present invention is an improved toner, comprising: a colorant; a toner resin mixed with the colorant, wherein each combined resin and colorant particle has an average size greater than 4 microns; and surface additive particles averaging greater than 30 nanometers in size, wherein the amount of such surface additives average greater than two (2) percent of the combined weight of resin and colorant in the toner. Another aspect of the present invention is an improved toner made by an improved process, comprising: mixing a toner resin and a colorant; extruding the resin and colorant mixture; attriting the resin and colorant mixture; classifying the attrited particles into particles averaging 4 to 10 micron in size; and blending sufficient surface additive particles and the classified particles in a high intensity blender for at least 10 minutes such that the weight of attached surface additives is greater than four (4) of the weight of the classified particles.

Yet another aspect of the present invention is an improved process for making toners, comprising mixing a toner resin and a colorant;

extruding the resin and colorant mixture; attriting the resin and colorant mixture; classifying the attrited particles into particles averaging 4 to 10 micron in size; and blending sufficient surface additive particles and the classified particles in a high intensity blender for at least 10 minutes such that the weight of attached surface additives is greater than three (3) percent of the weight of the classified particles.

BRIEF DESCRIPTION OF THE DRAWINGS

Other aspects of the present invention will become apparent as the following description proceeds and upon reference to the drawings, in which.

DETAILED DESCRIPTION OF THE DRAWINGS

While the present invention will hereinafter be described in connection with its preferred embodiments and methods of use, it will be understood that it is not intended to limit the invention to these embodiments and method of use. On the contrary, the following description is intended to cover all alternatives, modifications, and equivalents, as may be included within the spirit and scope of the invention as defined by the appended claims.

One aspect of the present invention is creation of a blending tool capable of generating more intensity (collisions/unit of time) than heretofore possible. This increased intensity is the result of an enlarged collision surface employing an aerodynamic-like shape that enables enlargement of the collision profile while minimizing vortices and particle voids in the zone behind the rotating blending tool. The combination of a larger collision profile and minimization of voids and vortices behind the tool result in more collisions per unit of time, or intensity. Such increase of intensity allows blending time to be decreased, thereby saving batch costs and increasing productivity.

Figure 1:
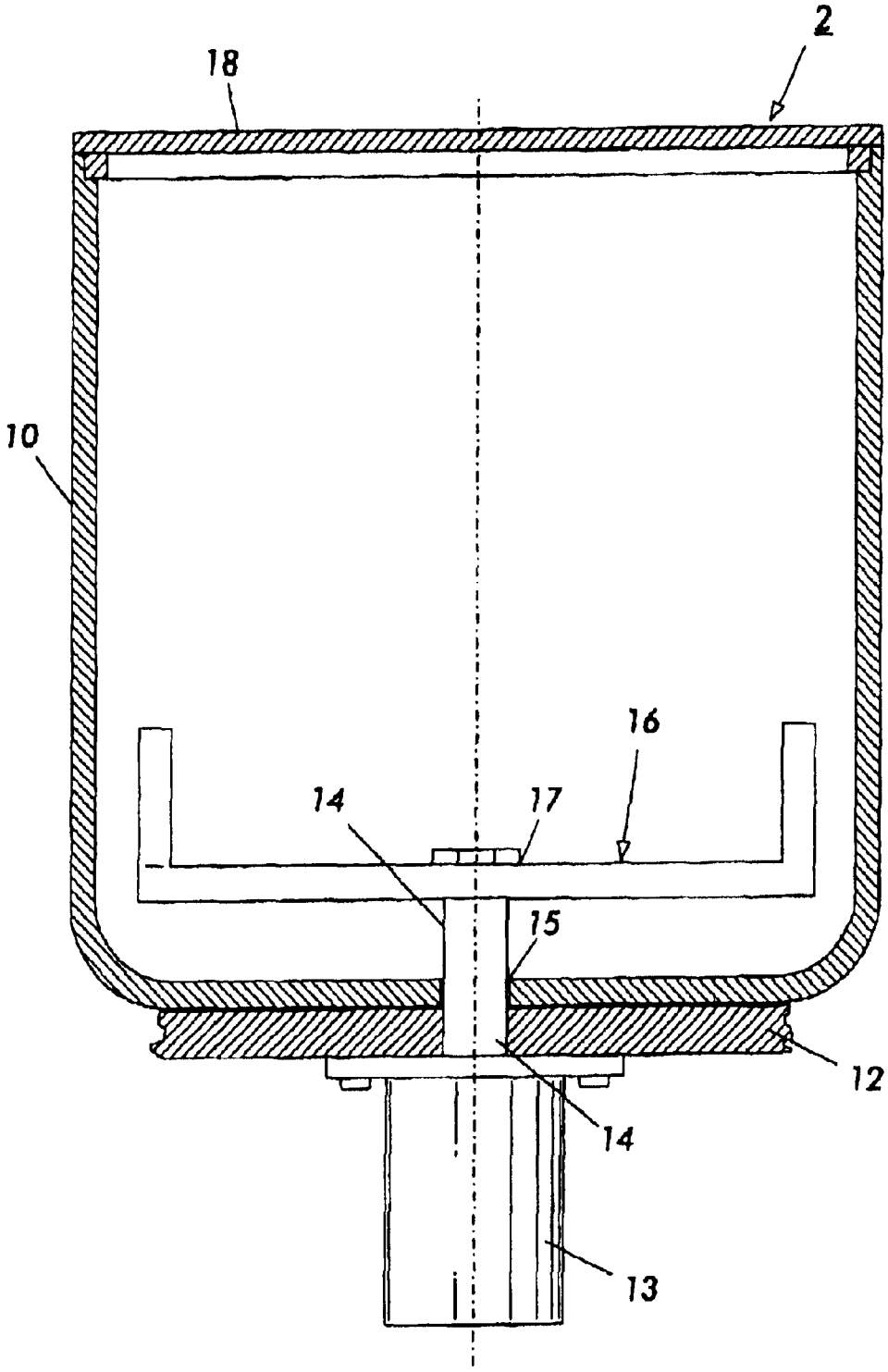
FIG. 1 PRIOR ART
FIG. 1 is a schematic elevational view of a blending machine of the prior art.
Figure 2:
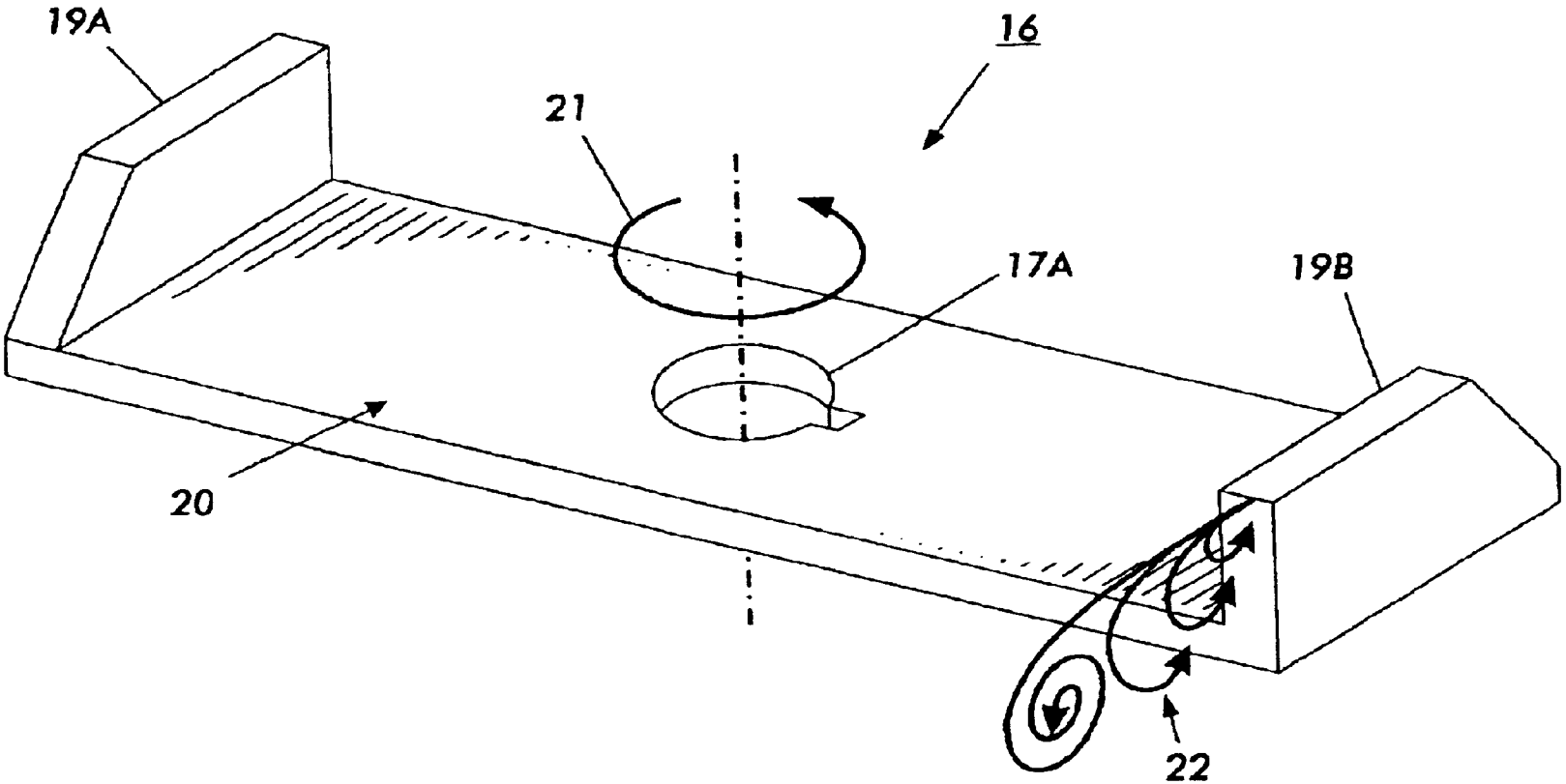
FIG. 2 PRIOR ART
FIG. 2 is a perspective view of a blending tool of the prior art.
Figure 3:
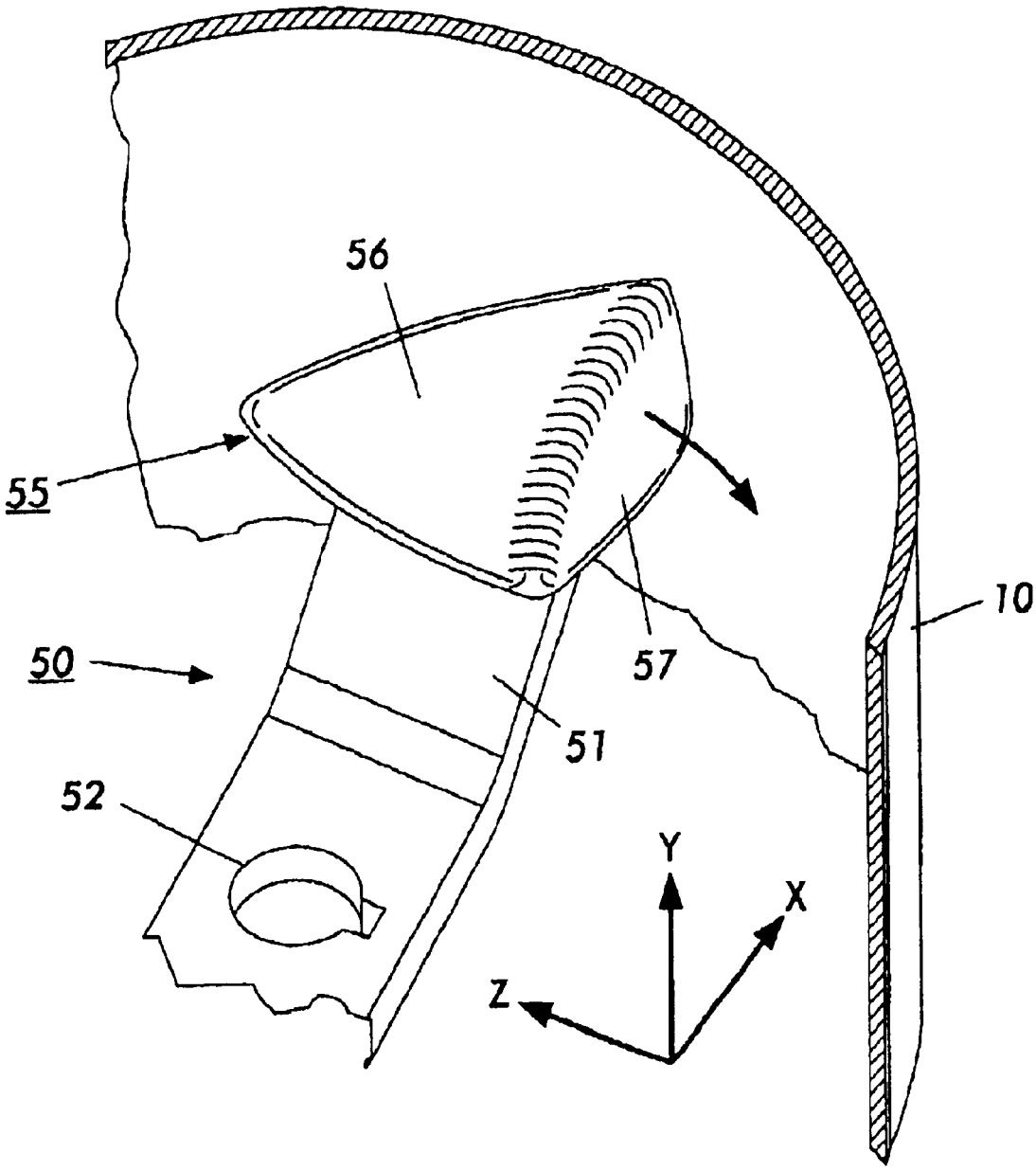
FIG. 3 is a perspective view of an embodiment of the blending tool of the present invention.

Accordingly, a blending tool 50 of the present invention is shown in FIG. 3 inside a vessel 10 that is similar to that shown in FIG. 1 above. Center shank 51 contains locking fixture 52 at its middle for mounting onto rotating drive shaft 14 (not shown) of the blending machine 2 (not shown). As shown in FIG. 3, an enlarged collision element comprises collision anvil 55 that is proportionately larger than the collision surface of blending tools of the prior art such as that shown in FIG. 2. In conventional tools, as discussed above, enlarged collision surfaces are not practical because a large collision surface creates too much "snow plow" compaction in front of the tool and vortices and relative voids in the wake of the tool. To overcome these impediments, a novel feature of the present invention is an enlarged collision element such as collision anvil 55 with cross-sectional perimeters of its leeward surfaces that decrease as such cross-sections are measured closer to the trailing edge of the tool, i.e., its sides and/or top and bottom surfaces tend towards convergence toward the trailing edge. This "negative slope" of the leeward surface increases intensity since particles that are pushed upward or sideways upon contact with the collision anvil slide along the leeward slope of the tool to fill its wake as the tool slides through the particle mixture. Although the actual movements of particles within a blending machine requires complex 3-dimensional analysis, it is believed that an arcuate shape best accomplishes the above design since it causes collision anvil 55 to function much like an air foil in a gas fluid. In other words, the particle media through which the blending tool moves acts like a fluid as it is mixed by the tool. As with an air foil, the sloping leeward shape helps minimize voids and turbulence behind the tool. The result is greater particle density available for collision by the next arm of the tool as it sweeps through the blending zone. Greater density of particles leads to grater intensity (collisions/unit of time). Additionally, as noted above, the rounded shape of the leading profile of collision anvil 55 results in more flow of particles over the tool and less "snow plow" compaction in front of the tool. The result is that for the same consumption of power by the blending machine, it is believed that the present invention allows either greater tool speed or a larger collision plate profile. Either greater speed or larger profile result in greater blend intensity.

For clarity, the portion of collision anvil 55 that adds to the profile of the tool can be considered its "leading surface" and is labeled 57 in FIG. 3. This is the surface that most directly impacts the particle media. The portion of collision anvil 55 to the rear of the leading surface can be considered its "trailing surface" and is labeled 56 in FIG. 3. Using the arcurately shaped trailing surface of the present invention, it is possible to increase the height, or y-axis dimension, of the collision anvil to exceed (even by a factor greater than 2 or 3) the depth, or z-axis dimension, of center shank 51 in the region proximate to where collision anvil 55 is attached. It is also possible to increase the width, or x-axis dimension, of collision anvil 55 to a width that exceeds (even by a factor greater than 1.5 or 2) the height, or y-axis, of center shank 51 in the region of center shank 51 proximate to where collision plate 35 is attached. For a large collision anvil 55, it is preferred that collision anvil 55 be hollow or comprised of a relatively thin plate in order to reduce its weight. Specifically, it is preferable that the leading surface of collision anvil 55 or other enlarged collision element of the present invention be less than one-half inch thick and preferably as thin as 3/16 inch thick.

It should be recognized that application of the above design principles enables any number of designs, including the design discussed below relating to use of adjustable and spaced apart collision plates. Although the preferred embodiment of this aspect of the invention comprises an arcurate shape over the entire trailing and leading surfaces, it may be possible to achieve an acceptable result using a negative slope over less than all (perhaps approximately one-half) of the entire trailing surface. It also preferred that most or all of the leading surface have an arcurate shape. The larger the profile of the collision surface, the larger the proportion of the trailing surface that must be negatively sloped in order to achieve the effects of the present invention.

Figure 4:
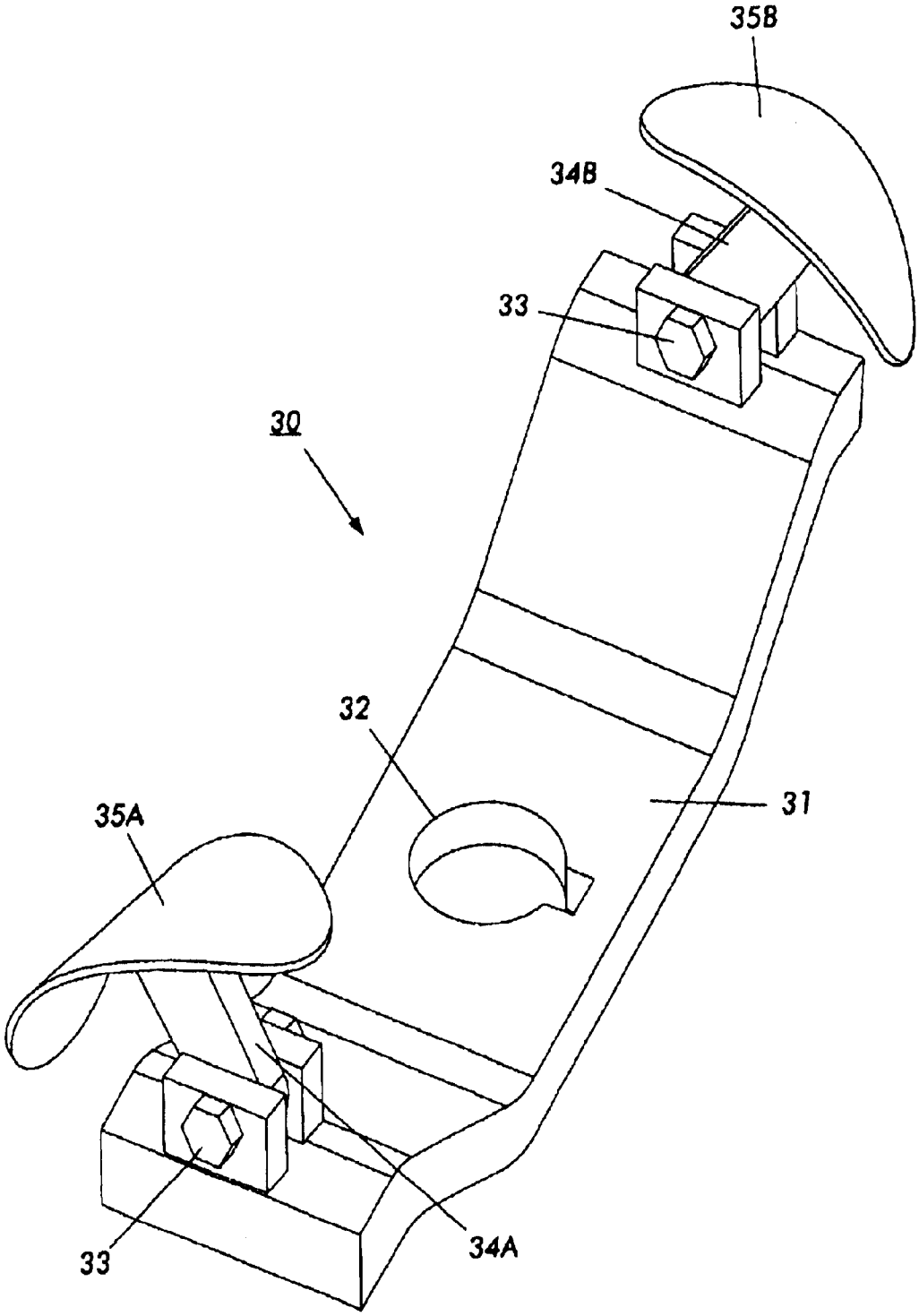
FIG. 4 is a perspective view of an embodiment of the blending tool of the present invention having an adjustable articulator hinge.

Yet another aspect of the present invention is a blending tool that allows reconfiguration of the effective collision surface size and profile without removal of the entire tool. Referring to FIG. 4, blending tool 30 comprises a center shank 31 and collision plates 35A and 35B. Center shank 31 contains locking fixture 32 at its middle for mounting onto rotating drive shaft 14 (not shown) of the blending machine 2 (not shown). Each end of center shank 31 contains a connecting mechanism 33 for rigidly mounting and holding an arm 34. Connecting mechanism 33 shown in FIG. 4 comprises a simple nut and bolt fastener which compresses together and rigidly positions collision plates 35A and 35B on arms 34A and 34B and on center shank 31, respectively. As will be described more fully below, below, different arrangements for positioning arms 34A and 34B are possible. Additionally, different arrangements for an adjustable collision surface are possible. For instance, each end region of the center shank 31 could comprise a leading edge flap connected to the center shank by one, two, or more connector mechanisms such that the angle of the flaps could be tilted down or raised much like the leading edge slat of some high speed jets and airplanes In the embodiment shown, mounted at the opposite end of arm 34A from mechanism 33 is an enlarged collision surface formed out of a collision plate 35A. Collision plate 35A differs from collision surfaces of the prior art since collision plate 35A is spaced apart and not integrally forged, welded, or otherwise formed as part of center shank 31. Additionally, collision plate 35A presents a substantially larger profile than the profile of center shank 31. Different arrangements for locking collision plate 35A into position are possible. For instance, collision plate 35A could be directly connected to center shank 31 without an arm 34A therebetween or arm 34A could be permanently attached to center shank 31 with a connecting mechanism between the arm 34A and collision plate 35A. Arm 34A can assume any number of embodiments, including compound elements, as long as arm 34A functions to position the collision plate apart from center shank 31. A preferred embodiment of the present invention uses a connecting mechanism such as mechanism 33 that enables removal and replacement of a collision plate when the collision plate reaches the end of its useful life due to abrasion and wear. Without such removable collision plates, the entire blending tool requires disposal or remanufacturing when the collision plate reaches the end of its useful life.

Connecting mechanism 33 can assume any number of arrangements long as it allows adjustment of the profile of the tool. In the embodiment shown, mechanism 33 allows arm 34A to pivot about the axis of center shank 31. In effect, mechanism 33 forms an articulator hinge that allows arm 34A to assume any number of angles in relation to center shank 31. This articulator hinge is a simple bolt and nut fastener that can be loosened and tightened with standard tools such as socket wrenches. Any number of other articulator hinges are possible as long as they allow arm 34A to pivot when the hinge is loosened and to be held rigidly in place once the hinge is tightened.

Figure 5:
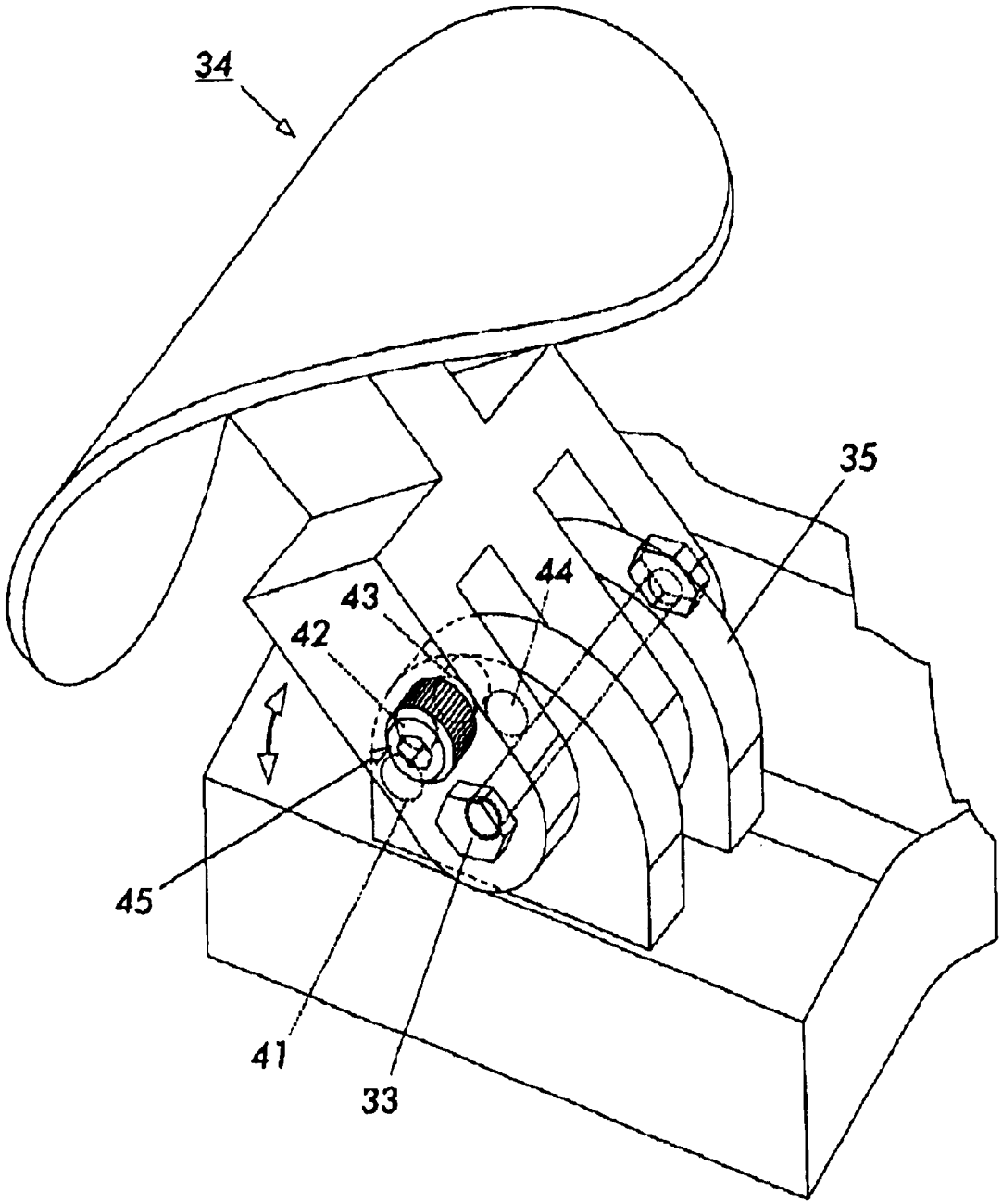
FIG. 5 is a perspective view of an embodiment of an articulator hinge of the present invention.

An example of an alternate embodiment of an articulator hinge 33 is shown in FIG. 5. The embodiment shown in FIG. 5 allows articulation of arm 34 into pre-set positions determined by alignment of bolt 45 (which runs through hole 46 in arm 34) with bored holes 41, 42, 43, and 44 formed in central hub 35. The process of articulating the hinge to these pre-set angles is accomplished by the relatively easy loosening and withdrawal bolt 45. As bolt 45 becomes withdrawn, arm 34 can be repositioned such that bolt 45 aligns with and can be inserted into one of alternate holes 41, 42, 43, and 44. Lastly, arm 34 is again secured in place by refastening bolt 45.

It should be recognized that may alternate designs for reconfigurable tools are possible. For instance, the above description of a leading edge flap could accomplish this purpose. Similarly, a movable collision surface, preferably a collision plate, could be connected directly to the center shank without an arm to provide spaced apart separation between the surface and the center shank. Although many such variations are possible, however, the preferred embodiment comprises an arm and a spaced apart collision plate as described above in relation to FIGS. 3 and 4.

The advantages of the reconfigurable blending tool of the present invention is made clear when the adjustment procedures are compared to the procedures necessary to change-out the non-adjustable tooling of the prior art. The conventional procedures are described above and require, among other steps, cleaning of the blending vessel and tool to gain access to the lock mechanism of the drive shaft of the blending machine followed by typical use of a crane or hoist to lift the tool out of the vessel. In contrast, the comparable process for altering the configuration of the blending tool of the present invention is as follows (numbers are in reference to FIG. 1 and FIG. 3, as applicable): (A) lid 17 is unfastened and opened from the top of vessel 10; (B) blending tool 16 needs to be at least partially cleaned by vacuum and by wiping in the region of articulator hinge 33; (C) articulator hinge 33 is loosened to allow arm 34 (and therefore collision plate 35) to be repositioned; (D) arm 34 is repositioned to the new angle required by the next formulation or product; (D) articulator hinge 33 is re-tightened.

In sum, blending tool 16 of the present with its articulator hinge enables significant time, safety, and productivity savings. Among the advantages are: 1) elimination of the need for a crane or hoist, thereby saving time (especially if such crane or hoist is not immediately available) as well as a requirement for expensive supplementary equipment such as a hoist; 2) human operators do not need to simultaneously position and fasten during removal of the old tools and placement of the new tool; and 3) cleaning tasks are greatly curtailed and simplified since the entire tool need not be cleaned for replacement, handling, or storage. Cleaning of vessel 10 is also lessened and shaft 14 need not be cleaned at all. Lastly, it is obviously less expensive to be able to use a single flexible blending tool for various formulations and products than to require an inventory of tools which must be substituted each time a formulation or product requires a different tool configuration.

Figure 6:
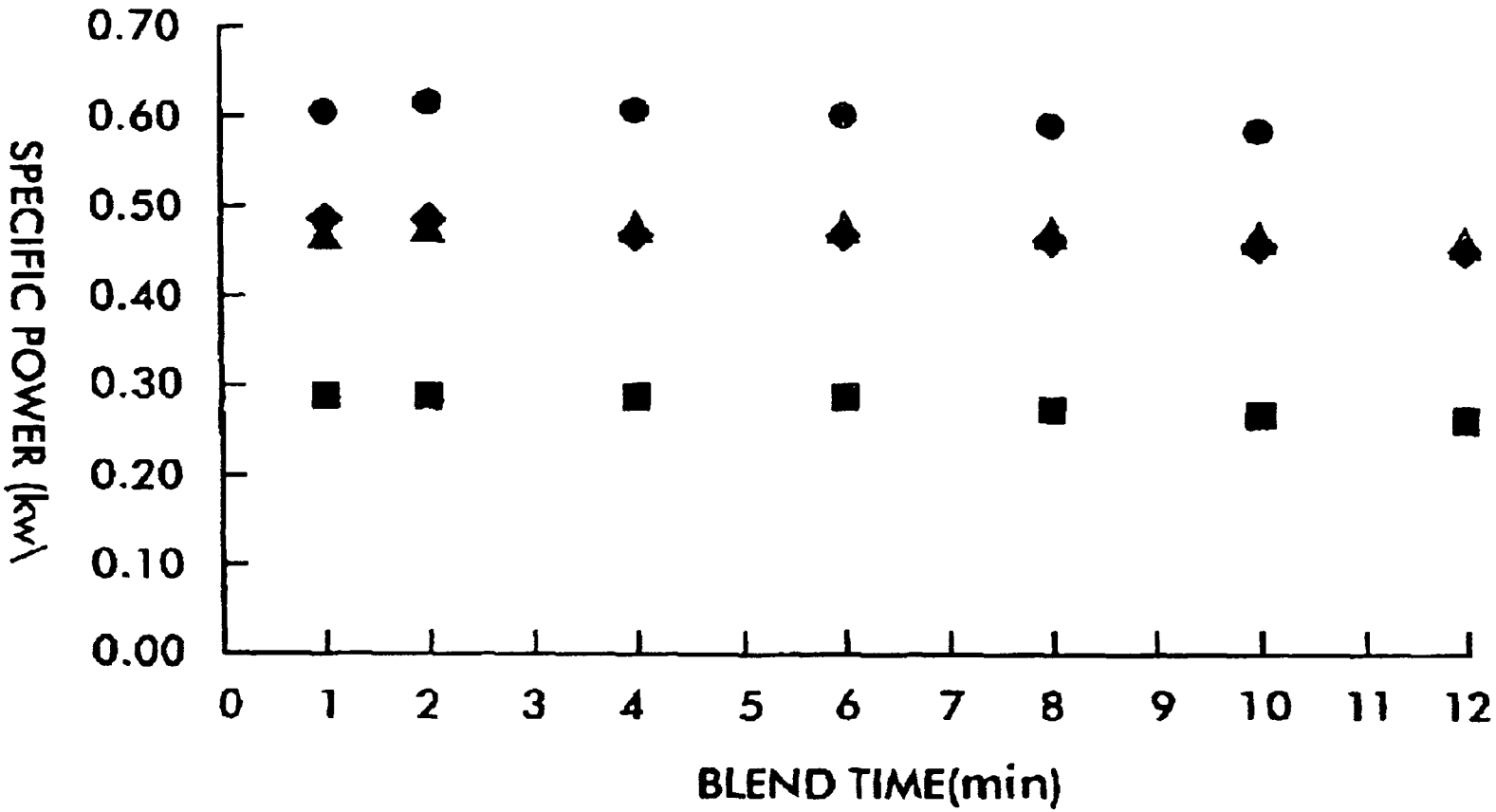
FIG. 6 is a chart showing specific power levels of the blending motor when using different configurations of the blending tool of the present invention and when using a conventional tool of the prior art.

The flexibility of the blending tool of the present invention is demonstrated in FIG. 6, which shows the various levels of intensity that were obtained with the tool of the present invention as it is reconfigured into different positions. Each of the 4 curves shown on FIG. 5 show data created during blending of Xerox toner for a Xerox Docucenter 265 multifunctional printer in a Henschel 75-liter blender. Four blends were made, all using the same tool speed. The vertical axis measures the specific power of the blending motor (W/lb) which, as discussed above, is considered a good measure of the blend intensity when using an efficient blending tool. The horizontal axis measures time of the blend. The curve marked with round data points shows the results with arm 34 set at 45 degrees, which angle offered the greatest tool profile for this experiment. As can be seen in FIG. 6, this curve with square data, reflecting the largest profile, shows the greatest blend intensity. The curve marked with diamond data points shows the results with arm 34 set at 22.5 degrees, while the curve marked with triangular data points shows the results with arm 34 set at 0 degrees. These angles cause decreasing tool profiles and, as expected, decreasing blend intensity that reflects the decreased profiles. Lastly, the curve with square shaped data points shows the results using a standard Henschel blending tool typically used when blending electrophotographic toners (this tool differs from the tool in FIG. 2). When compared to the results using the 45-degree arm position, the standard tool provided less than 50% of the blend intensity offered by the tool of the present invention at its maximum profile and intensity. Such results are to be expected since conventional tools lack both collision plates and arcuate trailing surfaces.

Yet another aspect of the present invention is an improved toner with a greater quantity of surface additives and with greater adhesion of these additive particles to the toner particles. As discussed above, newer color toner particles are in the range of 6–10 microns, which is smaller than previous monochrome toner particles. Additionally, whereas prior art toners typically have surface additives attached to toner particles at less than 1% weight percent, newer color toners require more robust flow aids, charge control, and other qualities contributed by surface additives. Accordingly, the size of surface additive particles is desired to be increased into the 30 to 50 nanometer range. The combination of smaller toner particles and larger surface additive particles makes attachment of increased amounts of additives more difficult.

In order to measure the adhesive force of surface additives to toner particles, a measurement technique is required. Such a technique is disclosed in patent applications titled "Method for Additive Adhesion Force Particle Analysis and Apparatus Thereof", U.S. Ser. No. 09/680,066, filed on Oct. 5, 2000, and "Method for Additive Adhesion Force Particle Analysis and Apparatus Thereof", U.S. Ser. No. 09/680,048, filed on Oct. 5, 2000. The technique taught in such applications yields a value known as an "Additive Adhesion Force Distribution" ("AAFD") value. Both applications are hereby incorporated by reference. In effect, AAFD value is a measure of how well a surface additive sticks to a toner particle even after being blasted with intense sonic energy. As specifically applied to the improved toners herein, the AAFD measurement technique comprises the following:

Stage 1—Stirring

1. Weigh approx. 2.6 g toner into 100 ml Beaker
2. Add 40 ml 0.4% Triton-X solution
3. Stir for 5 min. in 4 station automated stirrer (Start at 20K rpm, slowly increase to 30K–40K–50K rpm)
4. Check for non-wetted particles, re-stir if necessary.

Stage 2—Sonification (4 horn setup)

1. Sonify at 3 kJ, 6 kJ and 12 kJ in sonifier model Sonica Vibra Cell Model VCX 750 made by Sonics and Materials, Inc. using four (4) ⅝ inch horns at frequency of 19.95 kHz.
2. Horns are matched and calibrated for each energy level. For 3 kJ, the time is 2.5 to 3.0 minutes; for 6 kJ, time is 5.0 to 6.0 minutes; and for 12 kJ, time is 10.0–12.0 minutes.
3. Horn should be 2 mm from beaker bottom.
4. Transfer to labeled disposable 50 ml Centrifuge Tube (Pour ½ in, swirl, pour remainder in, add distilled water to bring solution to 45 ml.)
5. Centrifuge immediately Stage 3—Centrifuging 1. Centrifuge at 2000 rpm for 3 min.
2. Decant supernatant liquid, add 40 ml distilled water, shake well. (add 10 ml Triton-X solution if necessary)
3. Centrifuge at 2000 rpm for 3 min.
4. Decant supernatant liquid, add 40 ml DI, shake well
5. Centrifuge at 2000 rpm for 3 min.
6. Decant supernatant liquid, add very small amount of distilled water. Re-disperse w/spatula.

Stage 4—Filtering

1. Turn on filtration machine with wet Whatman #5 Filter
2. Rinse spatula with distilled water onto filter center; pour rinse slowly into center of filter; rinse 1 or 2 times with squirt of distilled water; pour rinse onto filter slowly, rinse with 10 ml distilled water; pour rinse onto filter
3. turn off filter machine
4. Remove filter and dry overnight on top of oven in hood.

Stage 5—Grinding/Pellet Press

1. Transfer Toner to weighing paper by turning filter over and tapping filter with spatula without scraping filter.
2. Curl weighing paper and pour sample into plastic grinder container.
3. Grind for 4–5 min.
4. Press into pellets Stage 6—Compute AAFD Value Analyze by Wavelength Dispersive X-Ray Fluorescence Spectroscopy (WDXRF) to compare percent of remaining surface additives (particularly $SiO_2$ and $TiO_2$) to percent of additives in non-sonified control pellets. The ratio equals the AAFD value expressed as a percent. WDXRF works because each additive such as $SiO_2$ can be detected by its characteristic frequency.

A series of Pareto analyses confirms that when AAFD values are computed for variations of blend intensity, blend energy (speed of tool), and amount of additives, the factor that most influences AAFD values is blend intensity. The second ranking factor is minimization of the amount of additives present. However, as discussed above, a goal of the improved toner of the present invention is both an increase in adhesion and an increase in the total quantity of additives. As such, an improved blending tool offering increased blend intensity is a prime factor in achieving the improved toner of the present invention.

A second set of Pareto analyses corroborates the importance of blend intensities and the relevance of AAFD values. In the second set of analyses, the ability of toner particles to flow easily without sticking together was measured in relation to blend intensity, blend energy, and the total quantity of additives. Certain surface additives such as silica are added to toner particles to ameliorate this tendency to stick together, or "cohesion", of toner particles. In the second set of Pareto analyses, blend intensity is again found to be the most significant factor in ameliorating the cohesion tendency of toners. The second most important factor is the quantity of additive particles. This is not surprising since the characteristic of certain additive particles is to decrease cohesion forces.

It is believed that blend intensity is the most important factor for AAFD values and for minimization of cohesion between toner particles both because blend intensity leads to greater mechanical and electrostatic adhesion between surface additive particles and toner particles and because the greater the blend intensity, the more even the distribution of additive particles around the surface of toner particles.

Figure 7:
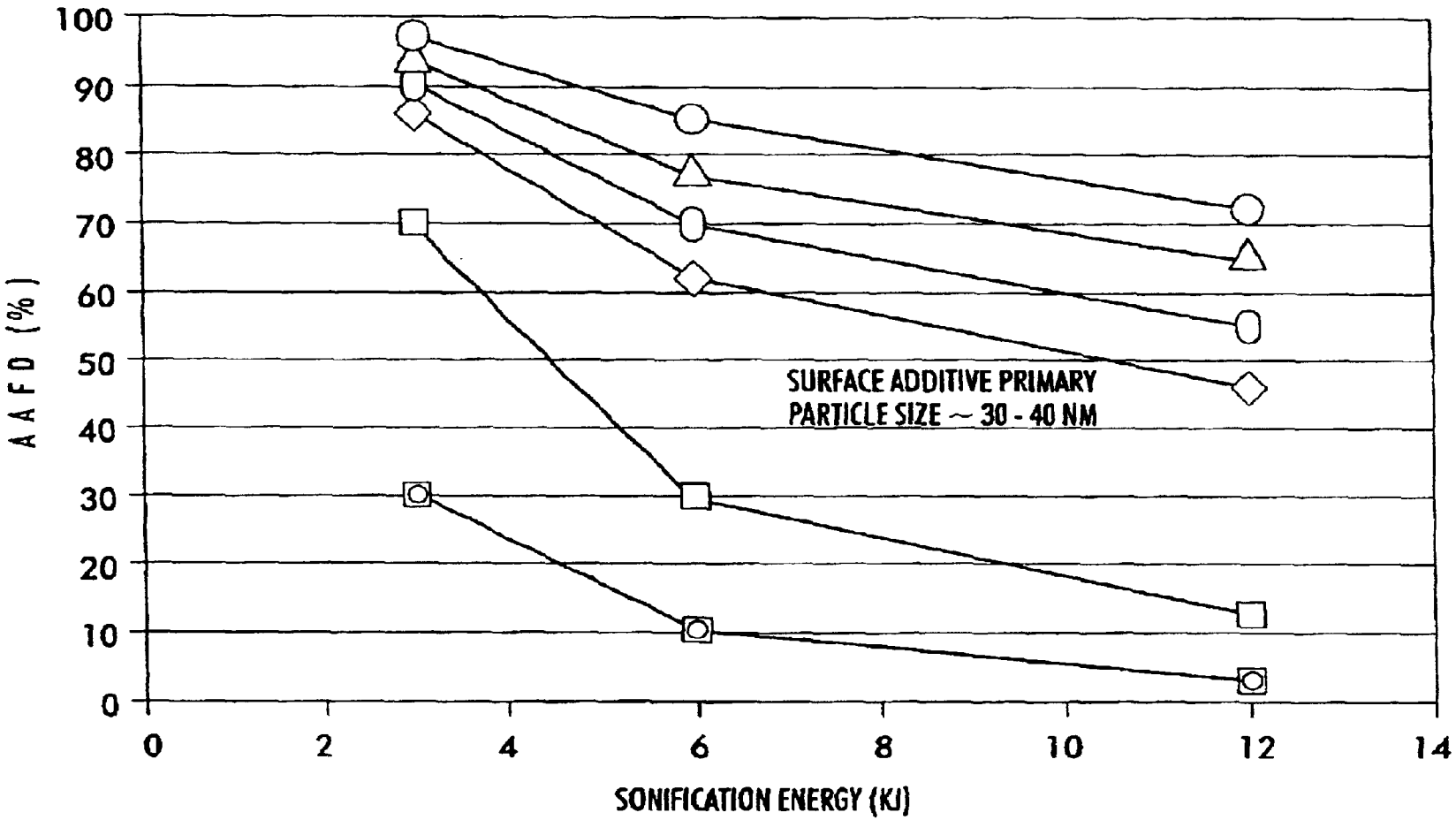
FIG. 7 is a chart showing AAFD Percent values for toners comprising various quantities of surface additives blended at different blending intensities.

Turning now to FIG. 7, a series of AAFD value curves are presented for various blend intensities and quantities of surface additives (by wt. %) when blended for less than 10 minutes. For each curve, the size of toner particles ranged from 4 to 10 microns, and the size of surface additives ranged from 30 to 40 nanometers. The results were as follows:

1) The curve with square data points shows AAFD values for conventional toners of the prior art having one (1) percent by weight surface additives using a conventional blending tool. Such conventional blending tools used for toners do not have raised collision surfaces as shown in FIG. 2 or as disclosed in the present invention. The 3 KJ value is estimated.
2) The curve with square-surrounding-circle data pints shows values for toners having four (4) percent by weight surface additives using a conventional blending tool used for manufacture of toners. The 3 KJ value is estimated.
3) The curve with round data points shows approximated AAFD values for toners having one (1) percent by weight surface additives using high intensity blending achieved with an enlarged collision surface.
4) The curve with triangular data points shows approximated AAFD values for toners having two (2) percent by weight surface additives using high intensity blending achieved with an enlarged collision surface.
5) The curve with oval data points shows approximated AAFD values for toners having three (3) percent by weight surface additives using high intensity blending achieved with an enlarged collision surface.

6) The curve with diamond data points shows AAFD values for toners having at least four (4) percent by weight surface additives using high intensity blending achieved with an enlarged collision surface of the present invention.

The results are consistent with the above described Pareto analyses. Specifically, where blending is most intense and the quantity of surface additives is smallest (the curve with round data points), then the AAFD values are highest. Where blend intensity is least but surface additive quantities are greatest (the square-surrounding-circle data points), then AAFD values are lowest. Since both high AAFD values and high quantities of surface additives are desired, then a preferred embodiment of the improved toner made using high intensity blending is represented by the curve with diamond data points, i.e. a toner comprising 4 to 10 micron toner particles having greater than 4 percent by weight of surface additives that average more than 30 nanometers, such toner yielding AAFD values in excess of 40 percent after 10 minutes of sonification at 12 kJ of energy. Such high additive quantities and high AAFD values are achievable using the high intensity blending of the present invention.

In summary, the blending tool of the present invention includes a collision plate, arcurate surfaces, and articulator hinge. When compared to known blending tools in the prior art, the present invention permits higher blend intensity than heretofore possible without snow plow compaction in front of the tool or vortices and voids in the wake of the tool. Additionally, the articulator hinge of the present invention enable a single blending tool of the present invention to assume a wide variety of different configurations, each enabling a different level of blend intensity as may be required by different formulations and products. Together, these improvements of the present invention enable greater blend intensity and overall productivity as well as savings in tool and inventory cost, time, and safety. When these advantages are applied to the manufacture of toners, substantial cost savings result. Moreover, the high intensity blending of the present invention yields an improved toner composition having greater quantities of surface additives than heretofore known and with greater adhesion between surface additives and toner particles.

It is, therefore, evident that there has been provided in accordance with the present invention a blending tool and toner particles that fully satisfies the aims and advantages set forth above. While the invention has been described in conjunction with several embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A toner, comprising:

(a) a colorant;

(b) a toner resin mixed with the colorant, wherein each combined resin and colorant particle has an average diameter size of [equal] *from 4* to [or less than about] 10 microns; and (c) surface additive particles [averaging less than about 40 nanometers in] *having an average particle* diameter size *of from 30 to 40 nanometers*, wherein the amount of such surface additives average equal to or greater than [about] two (2) percent of the combined weight of resin and colorant in the toner and wherein the Additive Adhesion Force Distribution percent value after 12 kilojoules of energy is greater than 40 percent.

2. The toner of claim 1, wherein the toner resin further comprises internal additives.

[3. The toner of claim 1, wherein the combined resin and colorant composite has an average diameter size in the range of about 4 to about 10 microns.]

4. The toner of claim 1, wherein the amount of surface additives average greater than [about] three (3) percent of the combined weight of resin and colorant in the toner.

5. The toner of claim 1, wherein the amount of surface additives average greater than [about] four (4) percent of the combined weight of resin and colorant in the toner.

6. The toner of claim 1, wherein the Additive Adhesion Force Distribution value percent value after 10 minutes of sonification and 12 kilojoules of energy is greater than 40 percent.

7. The [improved] toner of claim 6, the AAFD percent value is measured on toners blended for less than 10 minutes.

8. The toner of claim 1, wherein the Additive Adhesion Force Distribution percent values were obtained using four (4) ⅝ inch horns emitting at a frequency of 19.95 kilohertz from a distance of approximately 2 mm.

9. The toner of claim 1, wherein the toner is blended for less than 10 minutes.

10. The toner of claim 1, wherein the Additive Adhesion Force Distribution percent value after 6 kilojoules of energy is greater than 60 percent.

11. The toner of claim 1, wherein the Additive Adhesion Force Distribution percent value after 3 kilojoules of energy is greater than 80 percent.

[12. The claim 1, wherein:

(a) the combined resin and colorant composite has an average size in the range of about 4 to about 10 microns; and (b) the surface additive particles average between 30 and 50 nanometers in diameter size and wherein the amount of such surface additives average greater than four (4) percent of the combined weight of resin and colorant in the toner.]

[13. The toner of claim 12, wherein the Additive Adhesion force Distribution percent values were obtained using four (4) ⅝ inch horns emitting at a frequency of 19.95 kHz from a distance of approximately 2 mm.]

[14. The toner of claim 12, wherein the Additive Adhesion Force Distribution percent value after 6 kJ of energy is greater than 60 percent.]

15. An toner made by [an improved] *a* process[,] comprising:

(a) mixing a toner resin and a colorant;

(b) extruding the resin and colorant mixture;

(c) attriting the resin and colorant mixture;

(d) classifying the attrited particles into particles averaging [about] 4 to [about] 10 micron in size; and (e) blending sufficient surface additive particles and the classified particles in a high intensity blender for at least 10 minutes such that the weight of surface additives that become attached is greater than three (3) percent of the weight of the classified particles.

16. The toner of claim 15, wherein the weight of attached surface additives is greater than four (4) percent of the weight of the classified particles.

17. The toner of claim 15, wherein the blending is intense enough to yield Additive Adhesion Force Distribution percent values after 12 kJ of energy greater than 40 percent.

18. The toner of claim 15, wherein the blending is intense enough to yield Additive Adhesion Force Distribution percent values after 6 kJ of energy greater than 60 percent.

[19. The toner of claim 1, wherein the average diameter size of the surface additive particles is greater than about 30 nanometers.]

* * * * *